United States Patent [19]
Ruehle et al.

[11] Patent Number: 6,045,291
[45] Date of Patent: Apr. 4, 2000

[54] METHOD AND DEVICE FOR TRANSMISSION OF FORCES BETWEEN TWO JOINED PARTS

[75] Inventors: Felix Ruehle, Rutesheim; Hendrik Weihs, Riederich; Herrmann Hald, Leonberg; Peter Winkelmann, Kernen; Detlef Haensel, Stuttgart, all of Germany

[73] Assignee: Deutsches Zentrum fuer Luft- und Raumfahrt e.V., Bonn, Germany

[21] Appl. No.: 09/050,448

[22] Filed: Mar. 30, 1998

Related U.S. Application Data

[63] Continuation of application No. PCT/EP96/04280, Sep. 30, 1996.

[30] Foreign Application Priority Data

Oct. 4, 1995 [DE] Germany .................. 195 36 982

[51] Int. Cl.$^7$ ............................................. F16B 2/04
[52] U.S. Cl. .................. 403/297; 403/28; 403/408.1; 411/57; 411/500
[58] Field of Search .................. 403/297, 28, 30, 403/282, 408.1, 409.1; 411/45–48, 57, 60, 500, 501, 502

[56] References Cited

U.S. PATENT DOCUMENTS

| | | | |
|---|---|---|---|
| Re. 30,997 | 7/1982 | Briles | 411/500 X |
| 2,616,328 | 11/1952 | Kingsmore . | |
| 2,640,618 | 6/1953 | Hale, Jr. | 411/57 |
| 4,254,809 | 3/1981 | Schuster | 411/500 X |
| 4,263,833 | 4/1981 | Loudin et al. | 411/60 X |
| 4,411,570 | 10/1983 | Juric | 411/57 |
| 4,478,545 | 10/1984 | Mizusawa et al. | 411/57 |
| 5,259,689 | 11/1993 | Arand et al. | 411/502 X |
| 5,476,350 | 12/1995 | Kurtz et al. | 411/60 |
| 5,562,375 | 10/1996 | Jackson | 411/48 |
| 5,641,255 | 6/1997 | Tanaka | 411/48 |
| 5,689,873 | 11/1997 | Luhm | 411/501 X |

FOREIGN PATENT DOCUMENTS

| | | |
|---|---|---|
| 0 185 394 | 6/1986 | European Pat. Off. . |
| 0 487 890 | 6/1992 | European Pat. Off. . |
| 918504 | 10/1946 | France .................. 411/60 |
| 1 111 742 | 3/1956 | France . |
| 32 32 926 | 3/1984 | Germany . |
| 40 34 129 | 5/1992 | Germany . |
| 94 09 731 | 10/1994 | Germany . |
| 14756 | 8/1963 | Japan .................. 411/57 |
| 777270 | 11/1980 | U.S.S.R. .................. 411/501 |
| 590339 | 7/1947 | United Kingdom . |
| WO 95/25898 | 9/1995 | WIPO . |

*Primary Examiner*—Harry C. Kim
*Attorney, Agent, or Firm*—Barry R. Lipsitz; Ralph F. Hoppin

[57] ABSTRACT

A method for transmitting forces between two joined parts. A connection element is introduced into two corresponding openings in the two joined parts. A first undercut on a connection head of the connection element extends obliquely to the direction of force. The first undercut is applied to a first contact surface, which is operatively connected to the first joined part. A connection shank, starting from a connection head with an enlarged portion having a second undercut facing the first undercut, is introduced into the opening in the second joined part. The connection shank, with a longitudinal slot starting from the end surface at the shank end of the connection element, running in the direction of force and extending to the height of the enlarged portion, is compressed in the region of the enlarged portion. After the introduction, a spreading element is introduced into a receiving portion of the connection element. The receiving portion starts from an end surface of the connection element, runs in the direction of force, and extends to the height of the longitudinal slot. The connection shank is introduced into the opening in the second joined part so that, before the introduction of the spreading element into the receiving portion, the connection shank spreads again and rests with the second undercut in surface contact on a second contact surface which is operatively connected to the second joined part.

48 Claims, 5 Drawing Sheets

METHOD AND DEVICE FOR TRANSMISSION OF FORCES BETWEEN TWO JOINED PARTS

This application is a continuation of Ser. No. PCT/EP96/04280 filed Sep. 30, 1996.

BACKGROUND OF THE INVENTION

The invention relates to a method of transmission of forces between two joined parts, wherein a connection element is introduced into two corresponding openings in the two joined parts, wherein a first undercut which is disposed on a connection head of the connection element and extends obliquely with respect to the direction of transmission of force is applied to a first contact surface which is operatively connected to the first joined part, and wherein a connection shank starting from the connection head is introduced into the opening in the second joined part.

The invention further relates to a device for transmission of forces between two joined parts, with a connection element which has a connection head with a first undercut extending obliquely with respect to the direction of transmission of force as well as a connection shank starting from the connection head.

Large numbers of devices of the aforesaid type are known in the form of screwed or riveted connections in which use is generally made of metallic materials which have the necessary elastic deformability in these devices. However, the range of application of such devices and of the method associated therewith is limited to temperature ranges below approximately 1300° C., since the metallic materials cannot be used at higher temperatures. At higher temperatures ceramic materials are usually used, but these are not plastically deformable, are very brittle and tend to fracture when localized loading occurs. Since conventional connection techniques either plastically deform the material, as is the case for example with riveted connections or also with screwed connections in which stress peaks occurring are reduced by plastic deformation of the material or which require the material to have a high power of resistance against stress peaks, brittle materials are only of limited use for conventional methods of connection.

SUMMARY OF THE INVENTION

The object of the invention is to provide a method of the generic type which is also suitable for the use of brittle materials.

In a method of the type described in the introduction, this object is achieved according to the invention in that an enlarged portion which is disposed on the connection shank and has a second undercut facing the first undercut is introduced into the opening in the second joined part and the second undercut is applied to a second bearing surface which is operatively connected to the second joined part, wherein during the introduction the connection shank, which has a longitudinal slot starting from the end surface at the shank end of the connection element, running in the direction of transmission of force and extending to the height of the enlarged portion, is compressed in the region of the enlarged portion.

Due to the longitudinal slot an elastic deformability of the connection shank is achieved in the region of the enlarged portion, even in the case of brittle materials, so that the connection shank can be compressed to a sufficient extent to enable it to be introduced into the opening in the second joined part. When the connection shank is no longer compressed, it spreads out again elastically so that it presses with its second undercut against the second contact surface which is operatively connected to the second joined part. In this case the second joined part itself can have the second contact surface corresponding to the second undercut, so that the connection shank in the region of its second undercut presses in surface contact directly against the second joined part. However, it is merely necessary to have an operative connection between the contact surface and the joined part in such a way that the force exerted on the contact surface by the undercut is transmitted to the joined part. This force may for example be a compressive, tensile, shear or torsional force. Since the two undercuts of the connection element face one another and press in surface contact against the contact surfaces which are operatively connected to the first and second joined part respectively, the two joined parts are pressed against one another by way of the contact surfaces without stress peaks occurring on the connection element or plastic deformation of the latter occurring. Thus brittle materials can also be used for producing the connection element.

In order to increase the elastic deformability of the connection element it is advantageous if a connection element is used which has a plurality of longitudinal slots which cross centrally over one another transversely of the direction of transmission of force.

The forces acting on the connection element are particularly easy to monitor, and the calculations necessary for dimensioning this element are correspondingly more economical if a connection element is used which is of rotationally symmetrical construction.

The corresponding openings to be made in the two joined parts can be produced economically in the form of through bores if a connection shank Is used which is of cylindrical construction.

The costs for dimensioning the connection element and for producing a second bearing surface corresponding to the second undercut can also be reduced by using an enlarged portion constructed as a tapered frustum which forms a cone.

The necessary cone angle is produced by weighing up two opposing tendencies. In order to achieve a high loading capacity of the connection it is desirable to use the greatest possible undercut, i.e. the greatest possible cone angle. On the other hand, a great cone angle requires a correspondingly great elastic deformability of the connection shank since this latter must be correspondingly strongly compressed at the level of the enlarged portion when it is introduced into the opening in the second joined part. Accordingly, for the assembly of the connection element it would be desirable to use the smallest possible cone angle. Surprisingly, it has been shown that a cone angle in the range from approximately 2° to approximately 8° is already sufficient in order to achieve the necessary loading capacity of the connection.

A particularly favourable cone angle is produced in the range from approximately 3° to approximately 5°. Particularly in the case of brittle materials, the elastic deformability of which is limited, it is possible with such a cone angle to achieve simple assembly and at the same time a high loading capacity.

In an advantageous embodiment of the method it is provided that a connection element is used with a connection head which has a longitudinal slot starting from the head end of the connection element, running in the direction of transmission of force and extending to the height of the first undercut. In this way an elastic deformability is also achieved in the region of the connection head, so that both the connection head and the connection shank can be compressed and introduced into corresponding openings in the joined parts. Because of the elastic deformability achieved by the longitudinal slots, both the connection head and also the connection shank expand after assembly.

Assembly is simplified if a connection element is used in which it does not matter on which side the connection head is disposed and on which side the connection shank is disposed. Such simple assembly can be achieved in that a connection element is used in which the connection head and the connection shank are constructed in mirror symmetry with one another, wherein a normal to surface of the mirror plane extends so as to be colinear with respect to the direction of transmission of force. In this case it is advantageous if the longitudinal slot disposed on the connection head is aligned transversely of the longitudinal slot disposed on the connection shank, since in this way the longitudinal slots can each extend over more than half of the length of the connection element without merging into one another.

In order to prevent renewed deformation of the connection element after assembly in the event of very great loading, it may be provided that after the introduction of the connection element into the openings of the joined parts a deformable filling compound is introduced into the longitudinal slot or into the longitudinal slots of the connection element and is then hardened. Due to the hardened filling compound the connection element which spread after the introduction loses its elastic deformability. Thus even under great loading it remains in the expanded state.

The application of the method according to the invention is not limited to the second joined part having a second contact surface corresponding to the second undercut. In a particularly preferred embodiment of the method according to the invention it is provided that a guard element which envelops the connection shank in the region of the enlarged portion rests in surface contact on the outer surface of the enlarged portion. In this case the guard ring has the second contact surface corresponding to the second undercut and it forms a positive lock with the enlarged portion of the connection shank so that stress peaks are avoided. The guard element transmits the force exerted by the second undercut to the second joined part.

A sleeve may be economically used as the guard element. When an enlarged portion in the shape of a tapered frustum is used on the connection shank, surface contact can be achieved by the use of a guard element with a conically widening through bore, the cone angle of the through bore corresponding to the cone angle of the enlarged portion.

In an advantageous embodiment of the method it is provided that a guard element which can be connected to the second joined part is used. In this way a one-sided assembly can be achieved, in which it is merely necessary first of all to connect the guard element to the second joined part in the region of the opening thereof. The connection of the two joined parts is then produced by machining a through channel into the first joined part so that the connection element is inserted through the first joined part into the opening in the second joined part and introduced into the guard element connected to the second joined part. Due to the elastic expansion of the connection shank, the connection element is then pressed against the guard element and this latter is pressed against the second joined part.

In an advantageous embodiment of the method according to the invention which likewise facilitates one-sided assembly it is provided that a guard element is used which can be introduced into an opening in the second joined part and which transversely of the direction of transmission of force is divided into a plurality of segments each extending over a limited circumferential region. Due to the division radial stresses in the guard element can be avoided, so that the radially aligned forces of the spreading connection shank are transmitted to the second joined part surrounding the guard element whilst maintaining their line of application.

The elastic expansion of the connection shank in the region of the enlarged portion because of the longitudinal slots can be reinforced by the introduction of a spreading element which spreads the connection shank in the region of the enlarged portion into a receiving portion of the connection element which starts from an end surface of the connection element, runs in the direction of transmission of force and extends to the height of the longitudinal slot. The receiving portion in the region of the longitudinal slot makes it possible to introduce the spreading element into the connection element so far that the enlarged portion of the connection shank is expanded in the radial direction because of the longitudinal slot in addition to the elastic deformation. As a result particularly great forces can be transmitted between the two joined parts.

It is advantageous if a receiving portion is used which is of rotationally symmetrical construction.

In order to be able to introduce the spreading element particularly simply into the receiving portion it is advantageous if a spreading element of cylindrical construction is used.

During introduction the spreading element rests on the surface of the receiving portion so that a force acts on the receiving portion in the radial direction. The contact surface of the spreading element is subjected to a particular loading. The stress occurring can be reduced in an advantageous manner if a spreading element constructed as a tapered frustum is used which forms a spreading cone, since this results in the spreading element resting substantially in surface contact on the surface of the receiving portion.

The frictional forces which act between the spreading element and the receiving portion and result in self-locking of the spreading element can be increased if a spreading element is used which has a corrugation on its outer surface.

Particularly in the case of dynamic loading of the joined parts it is advantageous if a spreading element is used which has a toothing on the outer surface. A particularly high frictional force is produced by the toothing.

A particularly secure self-locking of the spreading element within the receiving portion can be effected by the use of a receiving portion which has a toothing on its wall.

In an alternative embodiment of the method according to the invention it is provided that the spreading element is secured not only by the occurring frictional forces but also by the introduction of a deformable filling compound into the receiving portion in the region between the inserted spreading element and the end surface of the connection element and subsequent hardening of the compound in the receiving portion. The hardened filling compounds effects permanent securing of the spreading element, in particular even when strong dynamic forces are transmitted between the joined parts.

When a spreading element is used the assembly can be simplified by the use of a connection element divided into two or more separate segments, with the longitudinal slot extending through the connection element. During assembly the segments can be placed against one another, then they are spread by the spreading element. Since the individual segments do not have to be deformed during introduction of the connection element into the openings in the joined parts, such an embodiment of the method according to the invention is particularly suitable for the use of very brittle materials.

If a connection element is used which is divided into two or more separate segments, then with the aid of the spreading element the connection element can be made to rest in surface contact on the contact surfaces which are operatively connected to the two joined parts solely by the expansion of the connection element due to the spreading element, without it being necessary for the connection head and connection shank each to have an undercut. In fact, the anchoring of the connection element can be achieved by the forces exerted by the spreading element on the segments of the connection element.

In an advantageous embodiment of the method it is provided that a connection element is used with a through channel which connects the receiving portion to the opposing end surface of the connection element. This offers the possibility, irrespective of the details of the assembly, of introducing one or more spreading elements either from the shank end and/or from the head end of the connection element into the receiving portion.

Previously it was assumed that the spreading element is pressed into the receiving portion. If joined parts are used which are susceptible to fracture, then when the spreading element is being pressed into the receiving portion of the connection element it is necessary for the connection element to be supported on the opposite side.

Such support can be avoided if the spreading element is drawn in with the aid of a pulling element passing through the through channel. In this case the spreading element can be positioned on an end surface of the connection element before assembly, so that with the aid of the pulling element a connection is made with the opposing end surface. After positioning of the connection element in the openings in the joined parts, the spreading element can be drawn into the receiving portion with the aid of the pulling element and at the same time the connection element can be supported on the end surface from which the pulling element projects. Thus, even in the case of delicate joined parts which are susceptible to fracture, it is not necessary during introduction of the spreading element into the receiving portion to support the connection element on the opposite side. This facilitates one-sided assembly.

The further the spreading element is introduced into the receiving portion, the greater is the radial force exerted by the spreading element on the surrounding connection shank. In order to prevent the connection shank from being overstressed, in a preferred embodiment of the method according to the invention it is provided that a pulling element is used which has a predetermined breaking point which breaks when a maximum tensile load is exceeded. If the maximum tensile load is reached, then the spreading element cannot be inserted any further because the predetermined breaking point of the pulling element breaks.

It is advantageous to use a pulling element with a predetermined breaking point which is constructed so that the maximum tensile load is reached when the desired end position of the spreading element inside the receiving portion is reached. This makes it possible to increase the tensile load on the pulling element beyond the maximum load, since in this case the spreading element in each case reaches the desired end position inside the receiving portion and the connection shank is corresponding expanded, then the pulling element breaks and the assembly is ended, In particular when great tensile loads occur it is advantageous to use a pulling element constructed as a pull rod.

In an alternative embodiment of the method which can be used particularly when lower tensile loads are to be reached, it is provided that a pulling element is used which is constructed as a traction wire or traction cable.

It is advantageous to use a connection head with a first undercut constructed as an annular cut-out from a spherical surface. This makes it possible to dispose the connection element at a different angle to the first joined part. As a result manufacturing tolerances of the first joined part can be compensated for in a simple manner.

In order also to be able to compensate for manufacturing tolerances of the second joined part it is advantageous if a connection shank is used with a second undercut which is constructed as an annular cut-out from a spherical surface. As a result the connection element can be disposed at a different angle to the second joined part.

When a guard element is used an angular compensation of the connection shank with respect to the second joined part can be effected by the use of a guard element with an outer surface constructed as an annular cut-out from a spherical surface. The guard element can be introduced into a corresponding opening in the second joined part, of which the wall resting against the outer surface of the guard element can likewise be constructed as an annular cut-out from a spherical surface in order to achieve surface contact, so that the guard element can be tilted in the opening in order to compensate for angular tolerances without thereby impairing the surface contact.

The introduction of an opening into the second joined part can be avoided by connection to the second joined part a bush which envelops the guard element and rests in surface contact on the outer surface thereof. Thus the bush constitutes the opening of the second joined part into which the guard element is introduced, so that no opening has to be machined into the second joined part itself.

It is advantageous to use a bush which exerts on the guard element a pre-tension which is directed radially inwards. The guard element is held thereby in the bush even without any load brought about by the connection element. This also has the consequence that a tension which is brought about by the connection shank spreading or expanding due to a thermal load and is directed radially outwards only brings about a relatively slight change in tension in the bush and in the guard element.

A pre-tension can be achieved for example by the use of a bush which is slotted in the longitudinal direction. This can be dimensioned in such a way that it widens in the slotted region during insertion of the guard element and then exerts a radially inwardly directed tension on the inserted guard element.

The pre-tension can be intensified by the use of a spring element which surrounds the slotted bush in the circumferential direction and acts on the bush with an inwardly directed radial force.

A lock washer can be used for example as the spring element.

The bush can be releasably connected to the second joined part.

For example, the bush can be screwed to the second joined part.

In order during assembly to be able to compensate for positional tolerances with regard to the mutual spacing of the two joined parts, in a preferred embodiment of the method according to the invention it is provided that a distance piece is disposed in the bush and holds the guard element spaced from the second joined part which can be connected to the bush. As a result a free space into which the connection element can protrude with its shank end region is formed between the guard element and the second joined part. As a result tolerances in the longitudinal direction of the connection element, i.e. tolerances with regard to the spacing of the two joined parts, can be compensated.

In this case it is particularly advantageous to use an enlarged portion with a small cone angle, since shifts in position of the connection shank can thereby result in only slight changes in the forces exerted on the guard element by the connection shank.

It is advantageous to use a distance piece constructed as a spacer ring, since as a result the guard element can be supported on the annular region of the distance piece and simultaneously due to the thickness of the ring a spacing can be achieved between the guard ring and the second joined part.

If direct contact between the connection shank and the second joined part is to be avoided, then a distance element constructed as a shim can be used for this purpose, wherein this shim has a recess machined in its upper surface facing the guard element and the guard element is retained by the edge regions of the recess. Thus the shim forms a bearing dish for the guard element, and the connection shank can extend through the guard ring until it comes to rest against the base of the dish, i.e. the central region of the upper surface of the shim facing the guard element. Thus a direct contact between the connection shank and the second joined part is prevented by the shim lying between them, and simultaneously by the retention of the guard element on the edge regions of the recess a free space is achieved between the guard element and the central region of the recess.

Positional tolerances and angular tolerances of the two joined parts can be compensated for by constructing the shim and the bush in such a way that the upper face of the shim facing the guard element and the inner wall of the bush facing the guard element form a common bearing surface constituting an annular cut-out from a spherical surface for an outer surface of the guard ring constructed as an annular cut-out from a spherical surface. Thus the inner wall of the bush and the upper surface of the shim jointly form a contact surface for the guard element so that the guard element can be pivoted without thereby impairing the surface contact between the guard element and the bush and between the guard element and the shim. Thus positional tolerances between the two joined parts can be compensated for with the aid of the intermediate space between the guard element and the central region of the recess and also angular tolerances of the second joined part with respect to the first joined part can be compensated for due to the pivotability of the guard element.

In order to be able to transmit compressive forces between the two joined parts, in a preferred embodiment of the method according to the invention it is provided that a pressure element which transmits a compressive force is positioned between the two joined parts. With the aid of the pressure element a compressive force can be transmitted from one joined part to the other joined part without the connection element or the guard element being loaded thereby in the direction of transmission of force.

If the connection element and pressure element are heated or cooled, this can lead to an expansion or a contraction of the elements. The consequence of this can be that the distance between the two joined parts as defined by the pressure element changes so that the seating of the connection shank is impaired. In order to avoid this it is advantageous if a pressure element is used of which the coefficient of thermal expansion is matched to the coefficient of thermal expansion of the connection element. Due to the adaptation of the coefficients of thermal expansion, in the event of a change of temperature stresses on the connection element are kept low by compensating for a change in length of the connection element by a change in length of the pressure element.

A simple positioning of the pressure element with respect to the connection element is produced by the use of a pressure element which surrounds the connection shank like a ring.

A hollow cylinder can be used for example as the pressure element.

It is advantageous to place the pressure element onto the bush connected to the second joined part. This produces a secure positioning if a pressure element is used in which the front wall facing the bush has a recess to receive the end region of the bush facing the pressure element. Thus the pressure element engages on the bush and can then no longer be moved transversely with respect to the bush.

A compressive force can also be transmitted between the two joined parts by the use of a connection element in which the connection head and connection shank each include a further, third or fourth respectively, undercut extending obliquely with respect to the direction of loading, these undercuts facing away from one another. The undercuts which face away from one another take up a compressive force acting on a joined part and transmit it via the connection element to the other joined part.

In this case it is particularly advantageous if, as explained above, the connection head and connection shank are constructed in mirror symmetry with one another, wherein the normal of the mirror plane extends colinearly with the direction of loading and the longitudinal slot disposed on the connection head is aligned transversely of the longitudinal slot disposed on the connection shank. Because of the construction in mirror symmetry it is not necessary to pay attention to the orientation of the connection element during assembly. Since two undercuts are disposed in each case on both the connection head and the connection shank, the first undercut of the connection head facing the second undercut of the connection shank whilst the third undercut of the connection head faces away from a corresponding fourth undercut of the connection shank, both tensile forces and compressive forces in addition to shear forces can be transmitted with the aid of the connection element.

As mentioned in the introduction, the method according to the invention is particularly suitable for the use of brittle materials. For use in the high temperature range, i.e. at temperatures above approximately 1300° C., ceramic materials are particularly suitable. Therefore in a particularly preferred embodiment of the method according to the invention it is proposed that a connection element, guard element, spreading element, pressure element and/or distance piece made from a ceramic material is used. This makes it possible to use the connection even at high temperatures, for example in the temperature range between 1600° C. and 1800° C.

The connections can be used for example in thermal protection systems such as are used in the ram point region of hypersonic or re-entry aircraft.

Because of the possibility of compensating for tolerances with regard to the position of the two joined parts, the method according to the invention can be used advantageously particularly when the corresponding joined parts are used in the high temperature range. The high temperatures lead on the one hand to marked thermal expansions and associated therewith to changes of angle between the two joined parts, and on the other hand marked temperature gradients can occur which lead to a differential thermal expansion and thus likewise to changes of angle.

If ceramic materials are used, on the one hand these are temperature-resistant and resistant to thermal shock and on the other hand they effect a thermal insulation between the two joined parts, so that for example there is only a very slight transfer of heat when a heat-insulating tile as first joined part is connected on a metallic sub-structure as second joined part.

Since angular tolerances can be compensated for with the method according to the invention, even at high temperatures and with correspondingly great thermal expansion there are no impact stresses acting on the connection element, as there are with conventional methods. Because of the impact stresses which usually occur and the danger of breakage associated therewith, the known methods and devices are only of very limited use in the high temperature range.

The method according to the invention also has the advantage that the connection between the two joined parts which is produced by means of the method can be released relatively simply, for example in that the spreading element which has been inserted into the receiving portion of the connection shank is pressed out of the connection shank, or by milling off the connection head. Thus the connection can be released without the two joined parts being affected.

It is particularly advantageous if a connection element, guard element, spreading element, pressure element and/or distance piece made from fibrous ceramic is used. Fibrous ceramic is particularly suitable for high-temperature use.

It is advantageous to use a heat-insulating and/or electrically insulating guard element and/or distance piece. In this way heat insulation or also electrical insulation of the two joined parts can be achieved without it being necessary for the connection element in particular to be constructed so as to be heat insulating and/or electrically insulating. Thus the choice of material for the connection element is not restricted to corresponding insulating materials and nevertheless achieves an insulation of the joined parts.

It is advantageous if a bush is used which is made from an elastically and plastically deformable material. For example in the case of excessively great temperature gradients the thermal expansion of the joined parts may lead to such a great change in angle that this can no longer be compensated for by the connection element. The result of this is increasing loading and ultimately overloading of the connection element. The increasing load first of all leads to an elastic deformation of the connection element, but in the case of excessive deformations the permissible forces on the connection element and on the joined parts can be exceeded. In order to avoid this, the possibility of deformation of the bush made from an elastically and plastically deformable material is exploited.

A bush made from a metallic material can be used for example.

In this case the bush can be dimensioned so that it deforms plastically before the maximum permissible stress in the ceramic parts is reached. Thus the bush acts as a protection against overloading, so that destruction of the connection element or of the joined parts is avoided.

As explained above, the spreading element can be introduced into the receiving portion of the connection shank by drawing it in with the aid of a pulling element. Because of the manufacturing tolerances, during assembly the spreading element can be drawn too far or not far enough into the connection shank before the predetermined breaking point of the pulling element breaks. This can lead to incorrect positioning of the spreading element. In order to avoid this, in an advantageous embodiment of the method according to the invention it is provided that an assembly tool is used which can be brought into engagement with the pulling element and exerts a controlled tensile force on the pulling element.

The position of the spreading element can be controlled by the use of an assembly tool which includes a measuring arrangement which determines the position of the spreading element within the receiving portion and/or the tensile force exerted on the pulling element. The measuring arrangement can for example determine the distance travelled by the spreading element as it is drawn into the receiving portion and the tensile force used therefor. Thus it is possible to monitor whether the spreading element has taken up the desired position and is pressing against the receiving portion with the desired force.

In particular in the case of brittle joined parts a stressing of the joined parts during assembly of the connection element should be avoided. Therefore in an advantageous embodiment of the method it is provided that an assembly tool which can be supported on the connection head is used to exert the tensile force on the pulling element. With such an embodiment the opposing force which is necessary for drawing in the spreading element is directed onto the connection head, so that the joined parts are not loaded.

It is also the object of the invention to construct a device for carrying out the method with a connection element which has a connection head with a first undercut running obliquely with respect to the direction of transmission of force as well as a connection shank starting from the connection head, this device being so constructed that it is also suitable for the use of brittle materials.

In a device of the type described in the introduction this object is achieved according to the invention in that the connection shank has an enlarged portion which has a second undercut facing the first undercut, and includes a longitudinal slot which starts from the end surface at the shank end of the connection element, runs in the direction of transmission of force and extends to the height of the enlarged portion. With the aid of the device according to the invention an elastic deformability is achieved as well as the possibility of surface contact on the joined parts to be connected, and stress peaks, which can lead to destruction of the connection element particularly when brittle materials are used, are avoided.

Preferred embodiments of the device according to the invention are the subject matter herein, the advantages of which have already been explained in connection with the explanation of the preferred embodiments of the method according to the invention.

The following description of preferred embodiments of the invention serves for more detailed explanation in conjunction with the drawings, in which:

DETAILED DESCRIPTION OF THE INVENTION

Figure 1:
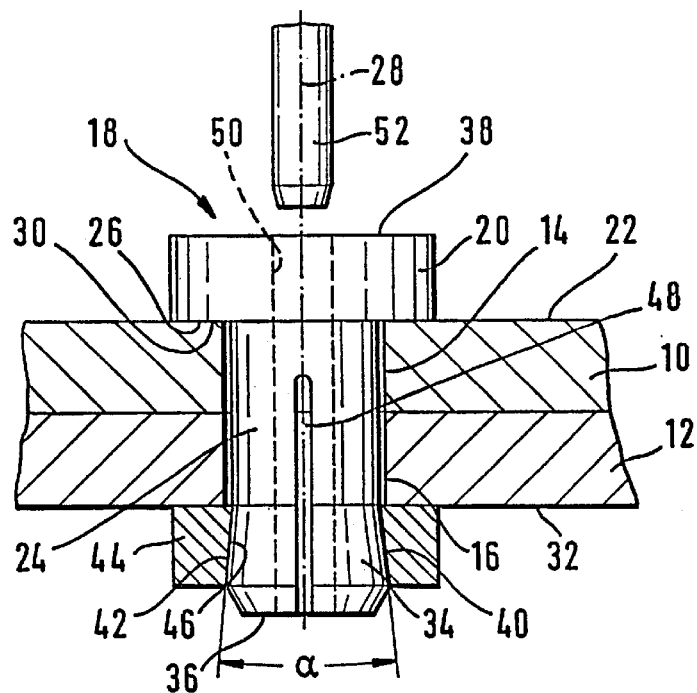
FIG. 1 shows a partial sectional representation of a first embodiment of the device according to the invention.

FIG. 1 shows a plate-shaped first joined part 10 and a plate-shaped second joined part 12, which rest against one another and which each have an opening in the form of a first through bore 14 and a second through bore 16. The two through bores 14, 16 are aligned with one another and each have the same diameter. A connection element 18 in the form of a bolt extends through the through bores 14 and 16 and butts with a cylindrical connection head 20 on an upper surface 22 of the first joined part 10 facing away from the second joined part 12. In the direction of the second joined part 12 the connection head 20 is adjoined by a cylindrical connection shank 24 with a smaller external diameter. The connection head 20 and connection shank 24 are constructed in one piece. In the transition region between the connection head 20 and the connection shank 24 there is disposed a recess 26 which with respect to an axis of symmetry 28 of the connection head 20 and of the connection shank 24 forms a first undercut 30 disposed transversely of the axis of symmetry 28. The connection shank 24 projects out of a lower face 32 of the second joined part 12 facing away from the first joined part 10 and has an enlarged portion 34 in the projecting region. The termination of the connection element 18 at the shank end forms an end surface 36 at the shank end which is disposed transversely of the axis of symmetry 28 and is disposed parallel to an end surface 38 at the head end which is disposed on the opposite end of the connection element 18.

The enlarged portion 34 is constructed in the form of a tapered frustum with an angle of taper α and an outer surface 40 which constitutes an annular cut-out from a tapered surface.

Thus the enlarged portion 34 forms a cone, the angle of taper α corresponding to the cone angle. With respect to the axis of symmetry 28 the outer surface 40 forms a second undercut 42 which faces the first undercut 30.

The enlarged portion 34 is surrounded by a sleeve-like guard ring 44 which rests with an inner surface 46 in surface contact on the outer surface 40 of the enlarged portion 34. Thus the guard ring 44 forms a positive lock with the enlarged portion 34.

A longitudinal slot 48, which runs diametrically through the connection shank 24 and extends in the longitudinal direction to the height of the first joined part, opens into the end surface 36 at the shank end.

The two end surfaces 36 and 38 are connected to one another by way of a centrally disposed central bore 50. Thus the central bore 50 runs in the longitudinal direction through the connection element 18. A peg-shaped spreading element 52 can be inserted into the central bore 50. The spreading element 52 can be of cylindrical or also of conical construction.

For assembly the connection element 18 is passed through the two through bores 14 and 16 of the two joined parts 10 and 12 and is compressed at the shank end. This is elastically deformable because of the longitudinal slot 48. In the compressed state the connection shank 24 is introduced with its enlarged portion 34 into the guard ring 44. Before the assembly of the connection element 18, this guard ring can be fixed on the lower face 32 of the second joined part 12, for example with the aid of an adhesive. However, it is also possible for the guard ring 44 to be clinched over the enlarged portion 34 of the connection shank 24 after the insertion of the connection element 18 into the two through bores 14 and 16. As soon as the connection shank 24 is no longer compressed in the radial direction, it spreads elastically again because of the longitudinal slot 48 and thereby with the outer surface 40 presses the enlarged portion 34 against the inner surface 46 of the guard ring. Because of the conical construction of the outer surface 40 a tensile force is thereby exerted on the first undercut 30 by the outer surface 40 acting as a second undercut 48, and thus the two joined parts 10 and 12 are compressed. After the positioning of the guard ring 44 on the enlarged portion 34 the spreading element 52 is introduced into the central bore 50. The consequence of this is that the connection shank 26 spreads additionally in the region of the longitudinal slot 48 and thus in particular in the region of the enlarged portion 34. In order to achieve this, the spreading element 52 has essentially the same diameter as the central bore 50. With the aid of the spreading element 50 the enlarged portion 34 is pressed permanently against the guard ring 44 and thus a firm connection is achieved between the two joined parts 10 and 12.

Figure 2:
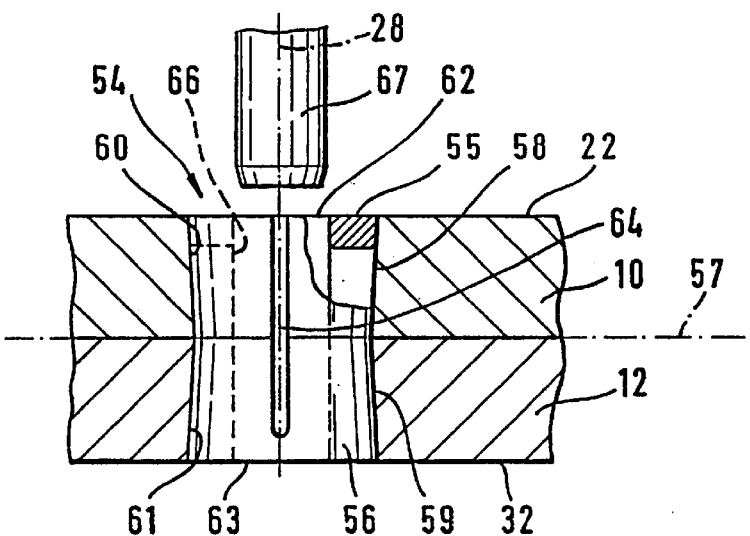
FIG. 2 shows a partial sectional representation of a second embodiment of the device according to the invention.
Figure 3:
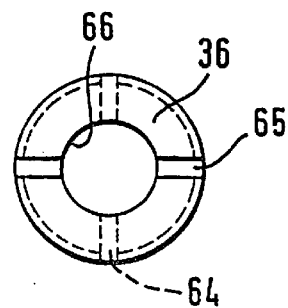
FIG. 3 shows a bottom view of a connection element used in the embodiment illustrated in FIG. 2.

A second embodiment of the device according to the invention is illustrated in FIGS. 2 and 3, in which identical components are denoted by the same reference numerals as in FIG. 1. In FIG. 2 a connection element 54 is shown which has a connection head 55 and a connection shank 56. In this case the connection shank is produced by mirroring of the connection head 55 on a mirror plane 57, of which the normal to surface extends colinearly with respect to the axis of symmetry 28 and thus colinearly with respect to the direction of loading of the connection element. The connection head 55 and the connection shank 56 are each constructed as a tapered frustum and have an outer surface 58 and 59 respectively. Thus the connection head 55 and the connection shank 56 each form a cone and rest with their outer surfaces 58 and 59 in surface contact against correspondingly conically shaped through bores 60 and 61 of the two joined parts 10 and 12 respectively. In contrast to the first embodiment, in the second embodiment the connection head 55 and connection shank 56 do not project out of the upper face 22 of the first joined part and the lower face 32 of the second joined part respectively, but terminate with these faces. A longitudinal slot 64 and 65 respectively extending diametrically through the connection head 55 and the connection shank 56 respectively opens in each case both into a head end surface 62 and into a shank end surface 63 of the connection element 54. The two longitudinal slots 64, 65 each run in the direction of the axis of symmetry 28, the longitudinal slot 64 which opens into the head end surface 62 being disposed transversely of the longitudinal slot 65 which opens into the shank end surface 63.

The two end surfaces 62 and 63 are connected to one another by a continuous central bore 66 into which a spreading element 67 can be introduced.

In order to produce the connection the connection element 54 is compressed in the radial direction and introduced into the conical through bores 60 and 61 of the two joined parts 10 and 12. Because of the elastic deformability produced by the two longitudinal slots 64 and 65, the connection head 55 and the connection shank 56 rest with their outer surfaces 58 and 59 respectively in surface contact on the walls of the through bores 60 and 61 respectively. Then the spreading element 67 is introduced into the central bore 66 and thus the connection element is additionally expanded.

In order to increase the elastic deformability of the connection element 54 and thus to ease the introduction into the through bores 60 and 61, the connection head 55 and the connection shank 56 can also have a plurality of, for example in each case two, longitudinal slots which cross over one another centrally.

Figure 4:
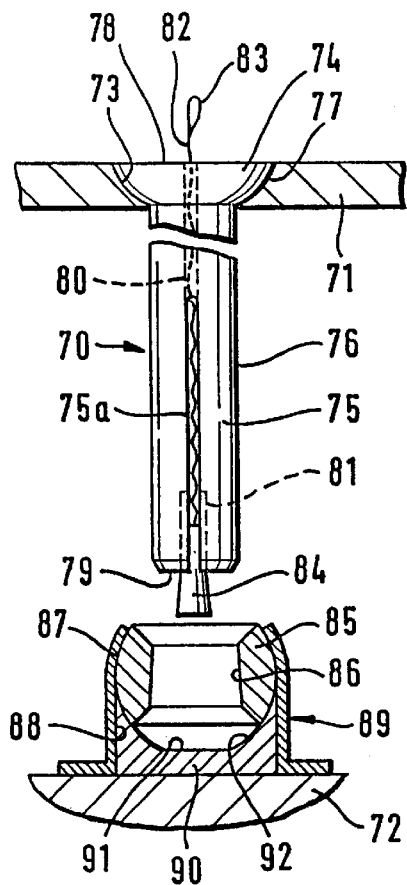
FIG. 4 shows a partial sectional representation of a third embodiment before assembly thereof.
Figure 5:
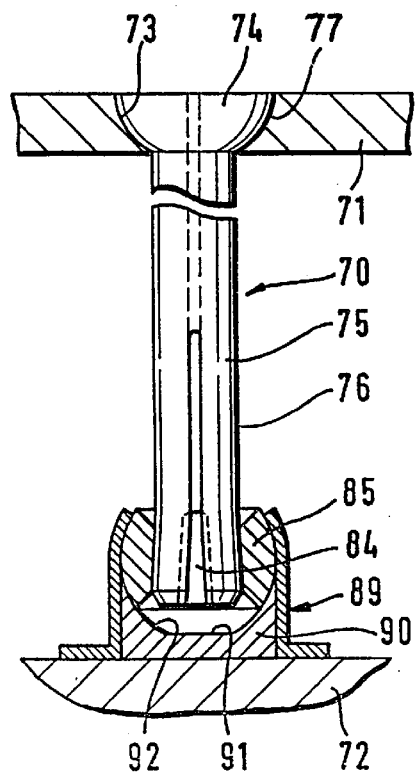
FIG. 5 shows a partial sectional representation of the embodiment illustrated in FIG. 3 after assembly thereof.

In FIGS. 4 and 5 a third embodiment of the device according to the invention is shown, in which with the aid of a connection element in the form of an anchor 70 a first joined part in the form of a heat-insulating tile 71 is fixed on a second joined part in the form of a metallic sub-structure 72. The anchor 70 comprises an anchor head 74 introduced into a through opening 73 in the heat-insulating tile 71 and an anchor shank 75 which adjoins the anchor head in the direction of the metallic sub-structure 72. The anchor shank 75 is constructed as a tapered frustum with a conically widening outer surface 76. Starting from the anchor shank 75 the anchor head 74 widens and thus forms a first undercut 77 which is constructed as an annular cut-out from a spherical surface. The termination of the anchor head 74 is formed by a planar head end surface 78 disposed transversely of the longitudinal axis of the anchor shank. A shank end surface 79 is disposed on the opposite end of the anchor 70 parallel to the head end surface 78. The two end surfaces 78 and 79 are connected to one another by way of a stepped central bore 80 which widens abruptly at the level of the shank end region of the anchor 70 and forms a widened portion 81. A traction wire 82, which projects out of the head end surface and with its projecting region forms a traction loop 83, extends through the central bore 80. The end of the traction wire 82 opposite the traction loop 83 is connected to a spreading element in the form of a spreading cone 84 which can be drawn into the widened portion 81.

As in the embodiments already described above, the third embodiment of the connection element shown in FIGS. 4 and 5 is also slotted, and for this purpose the anchor shank 75 has a longitudinal slot 75a which opens into the shank end surface 79, passes diametrically through the anchor shank 75 and extends in the longitudinal direction to the height of the end region of the anchor shank 75 adjoining the anchor head 74.

So long as the spreading cone 84 has not yet been drawn into the widened portion 81, the shank end region of the anchor 70 can be passed through a guard ring 85, the inner face 86 of which facing the outer surface 76 of the anchor 70 is likewise conically shaped, so that after the introduction of the anchor 70 the guard ring 85 rests in surface contact on the shank end region of the outer surface 76 and is therefore connected by positive locking to the anchor 70. The outer face 87 of the guard ring 85 lying opposite the inner face 86 is constructed as an annular cut-out from a spherical surface and rests in surface contact on an inner wall 88, which is correspondingly constructed as an annular cut-out from a spherical surface, of a metal bush 89 connected to the metallic sub-structure 72. The metal bush 89 is releasably connected by means of a screw connection (not shown in the drawing) to the metallic sub-structure 72. A shim 90 is disposed inside the metal bush 89 between the guard ring 85 and the metallic sub-structure 72. A recess 92 is machined into an upper face 91 of the shim facing the guard ring 85, and in its radially outer region this recess forms a bearing surface for the outer face 87 of the guard ring 85, the bearing surface being constructed as an annular cut-out from a spherical surface. The upper face 91 of the shim 90 continuously follows the inner wall 88 of the metal bush 89 with its recess 92, so that the guard ring 85, which in the radially outer region of the recess 92 rests on the upper face of the shim 90 and thus is held spaced from the metallic sub-structure 72, can be tilted in the metal bush 89 without the surface contact of the outer face 87 on the inner wall 88 of the metal bush 89 and on the radially outer region of the recess 92 being affected.

In FIG. 5 the third embodiment is shown, according to which the shank end region of the anchor 70 has been introduced into the guard ring 85 and then the spreading cone 84 has been drawn into the widened portion 81 with the aid of the traction wire 82. Because of the elastic deformability of the anchor shank 75 produced by the longitudinal slot 75a and because of the spreading action of the spreading cone 84 the anchor shank 75 is pressed radially outwards so that its outer surface 76 rests in surface contact on the inner face 86 of the guard ring 85. The guard ring 85 shown in FIGS. 4 and 5 is divided into a plurality of segments (not shown in the drawing) which in each case extend over a limited circumferential region. The radial force emanating from the expanded anchor shank 75 can be passed on thereby in the radial direction to the metal bush 89 surrounding the guard ring 85 without radial stresses occurring in the guard ring 85. Since the guard ring 85 only rests on the shim 90 in the radially outer region of the upper face 91, the anchor 70 introduced into the guard ring 85 is held with its shank end surface 79 spaced from the upper face 91 of the shim 90. Variations of the spacing between the heat-insulating tile 71 and the metallic sub-structure 72, such as occur for example because of manufacturing tolerances, can therefore be compensated for in that the anchor shank 75 protrudes more or less far into the space between the guard ring 85 and the central region of the upper face 91 of the shim 90.

Variations with regard to the orientation of the heat-insulating tile 71 relative to the metallic sub-structure 72, such as may be brought about for example in the case of temperature rises due to differing thermal expansion, can be compensated for in that the anchor shank 75 and the guard ring 85 surrounding it tilt within the metal bush 89.

Furthermore, a compensation in terms of the angle is also achieved in that the first undercut 77 of the anchor head 74 is constructed as an annular cut-out from a spherical surface and thus can likewise tilt within the through opening 73 of the heat-insulating tile 71 without the surface contact being affected.

Figure 6:
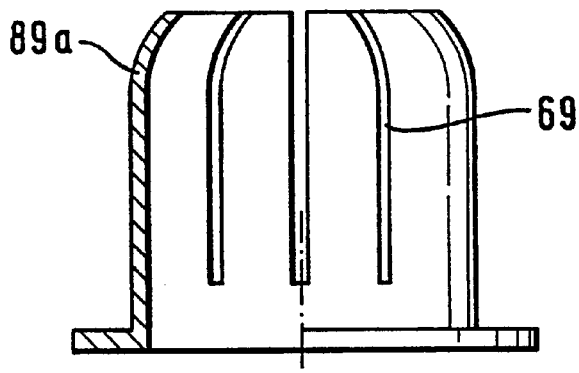
FIG. 6 shows a partial sectional representation of an alternative construction of the metal bush used in the third embodiment and illustrated in FIGS. 4 and 5.
Figure 7:
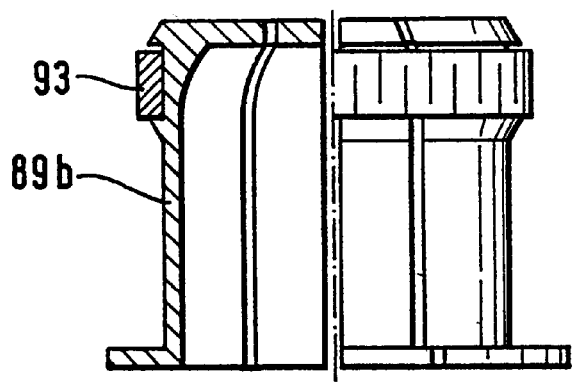
FIG. 7 shows a second alternative construction of the metal bush used in the third embodiment and illustrated in FIGS. 4 and 5.
Figure 8:
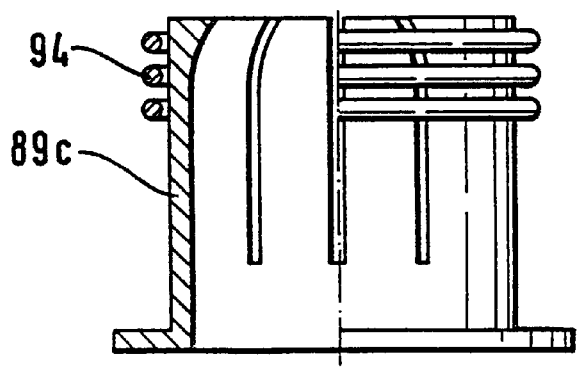
FIG. 8 shows a third alternative construction of the metal bush used in the third embodiment and illustrated in FIGS. 4 and 5.

Alternative embodiments of the metal bush 89 shown in FIGS. 4 and 5 are shown in FIGS. 6, 7 and 8. The metal bush 89a shown in FIG. 6 includes longitudinal slots 69 disposed in the longitudinal direction, so that the metal bush 89a is elastically deformable in the radial direction. As a result it can be dimensioned in such a way that the guard ring 85 shown in FIGS. 4 and 5 widens the metal bush 89a in the radial direction when it is positioned in the metal bush 89a. Because of the elastic deformability the metal bush 89a then effects a pre-tension which acts radially inwards on the guard ring 85. This already acts on the guard ring 85 when the anchor shank 75 has not yet been introduced into the guard ring 85. Because of the pre-tension the guard ring 85 is held in the metal bush 89a, and the pre-tension has the additional effect that a radial force, which may be brought about for example by the spreading anchor shank 75, only causes a relatively slight change in tension in the metal bush 89a and in the guard ring 85.

In FIG. 7 a metal bush 89b is shown which in order to increase the pre-tension acting on the guard ring 85 is surrounded by a lock washer 93 in the end region facing the anchor shank 75. Due to the lock washer 93 the upper end region of the metal bush 89b is acted on elastically by a radial force which acts inwards, by which a particularly high pre-tension can be achieved when the guard ring 85 is positioned in the metal bush 89b.

In FIG. 8 a metal bush 89c is shown which is surrounded by three elastic rings 94 in its upper end region, i.e. the end region facing the anchor shank 75 of the anchor shown in FIGS. 4 and 5. In this case these rings may for example be made from a material with particularly high elasticity or open metal rings, i.e. metal rings which are interrupted in a limited circumferential region. The rings 94 cause an elastic spring force on the upper end region of the metal bush 89c, so that this latter causes a great pre-tension in the guard ring 85 so long as the guard ring is positioned in the metal bush 89c. As already described in the case of the embodiments of the metal bush shown in FIGS. 6 and 7, the guard ring 85 is also held in the metal bush 89c because of the prevailing pre-tension, even when the anchor shank 75 has not yet been introduced into the guard ring 85. Because of the prevailing pre-tension an expansion of the anchor shank 75 after it has been introduced into the guard ring 85 positioned in the metal bush 89c only causes a relatively small change in tension.

Figure 9:
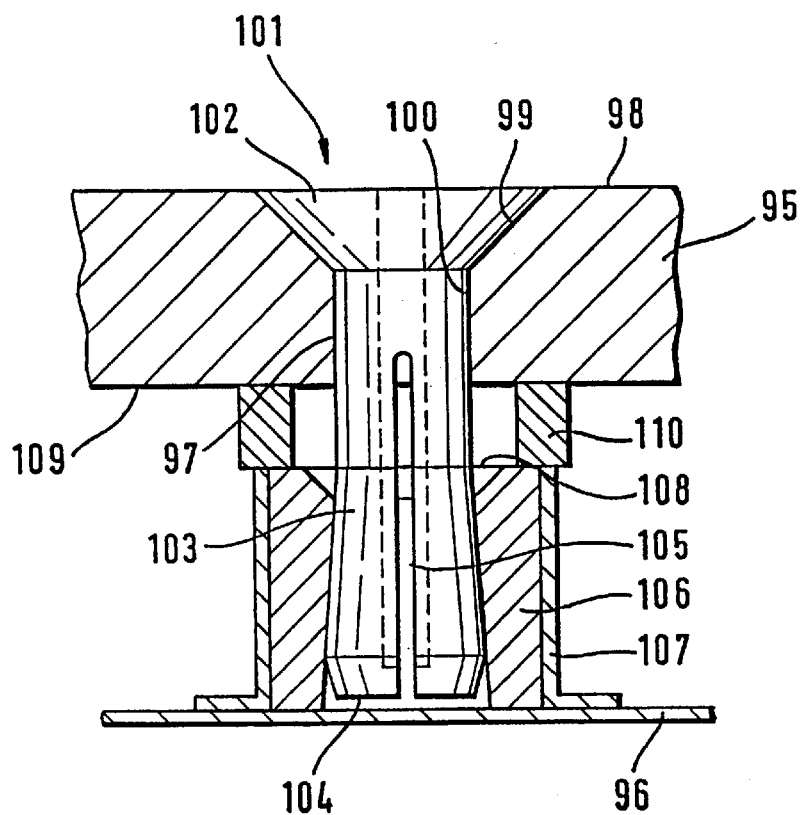
FIG. 9 shows a partial sectional representation of a fourth embodiment of the device according to the invention.

A further advantageous embodiment of the device according to the invention is shown in FIG. 9. This is particularly suitable for transmitting compressive loads between a first joined part 95 and a second joined part 96. A through opening 97 is machined into the first joined part 95, and starting from an upper face 98 of the first joined part 95 facing away from the second joined part 96 this through opening comprises a conically tapered entry portion 99 and an adjoining cylindrical exit portion 100. A connection element 101, which rests in surface contact on the entry portion 99 with a connection head 102 in the shape of a tapered frustum, extends through the through opening 97. A connection shank 103 which widens conically and terminates with an end surface 104 at the shank end adjoins the connection head 102 in the direction of the second joined part 96. A longitudinal slot 105 which passes diametrically through the connection shank 103 opens into the shank end surface 104. The shank end region of the connection shank 103 is surrounded by a guard sleeve 106 which rests in surface contact on the outer face of the connection shank 103 and is in turn disposed in a metal sleeve 107 connected to the second joined part 96. Between an upper face 108 of the metal sleeve facing the first joined part 95 and a lower face 109 of the first joined part 95 facing the second joined part 96 there is disposed a pressure sleeve 110 which rests on the upper face 108 of the metal sleeve 107 and with its opposing end face rests in surface contact on the lower face 109 of the first joined part.

Compressive forces between the two joined parts 95 and 96 can be transmitted by way of the metal sleeve 107 and the pressure sleeve 110. In the event of thermal loading of the joined parts 95, 96 and the connection element 101, in order to prevent the connection shank 103 from spreading in the longitudinal direction so far that it comes to rest with its shank end surface 104 on the second joined part 96 and thus experiences a force in the direction of the first joined part 95, a material is used for the pressure sleeve 110 of which the coefficient of thermal expansion is matched to the coefficient of thermal expansion of the connection shank, so that the pressure sleeve 110 and the connection shank 103 expand and contract so that in the case of thermal loading no internal tensions occur.

Figure 10:
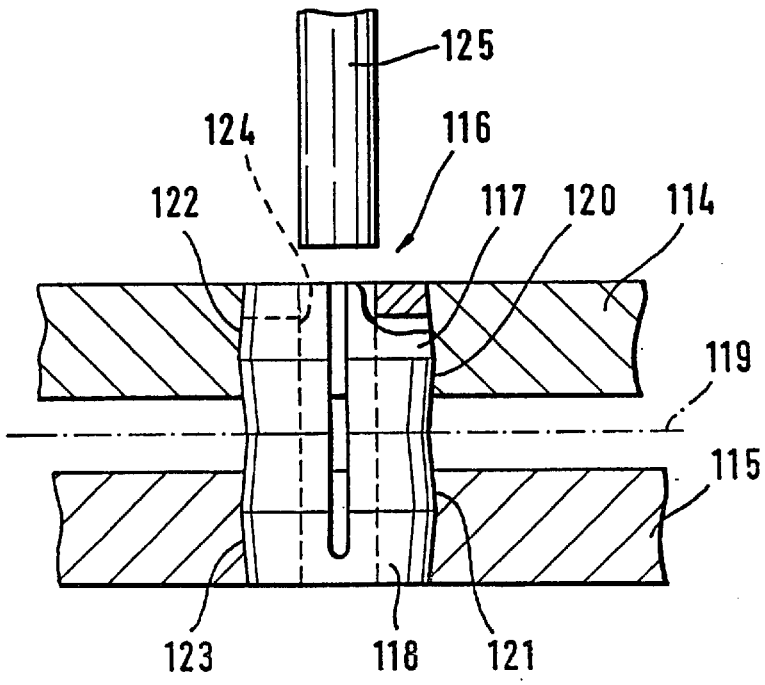
FIG. 10 shows a partial sectional representation of a fifth embodiment of the device according to the invention.

A further embodiment of the device according to the invention which is constructed for transmitting a compressive load between a first joined part 114 and a second joined part 115 is shown in FIG. 10. In this case a connection element 116 is used in which, corresponding to the embodiment shown in FIG. 2, a connection head 117 is constructed in mirror image to a connection shank 118, a mirror plane 119 being aligned with the normal to surface disposed parallel to the longitudinal direction of the connection element 116. The connection head 117 and the connection shank 118 in each case have two undercuts, wherein a first undercut 120 on the connection head 117 points to a second undercut 121 disposed on the connection shank 118, whilst a third undercut 122 disposed on the connection head 117 faces away from a fourth undercut 123 disposed on the connection shank 118. The connection element 116 is slotted in the longitudinal direction corresponding to the connection elements described above and as a result has an elastic deformability in the radial direction. In addition a spreading element 125 can be introduced into a central bore 124 passing through the connection element 116 in the longitudinal direction, which intensifies the expansion of the connection element 116.

With the aid of the first and second undercuts 120 and 121 respectively, a tensile load can be transmitted between the two joined parts 114 and 115 as is already the case in the embodiments described above. In addition, because of the third undercut 122 and the fourth undercut 123 which face away from one another, a compressive load can also be transmitted between the two joined parts 114 and 115 without an additional pressure element, such as for example the pressure sleeve 110 shown in FIG. 6, having to be used for this purpose.

Figure 11:
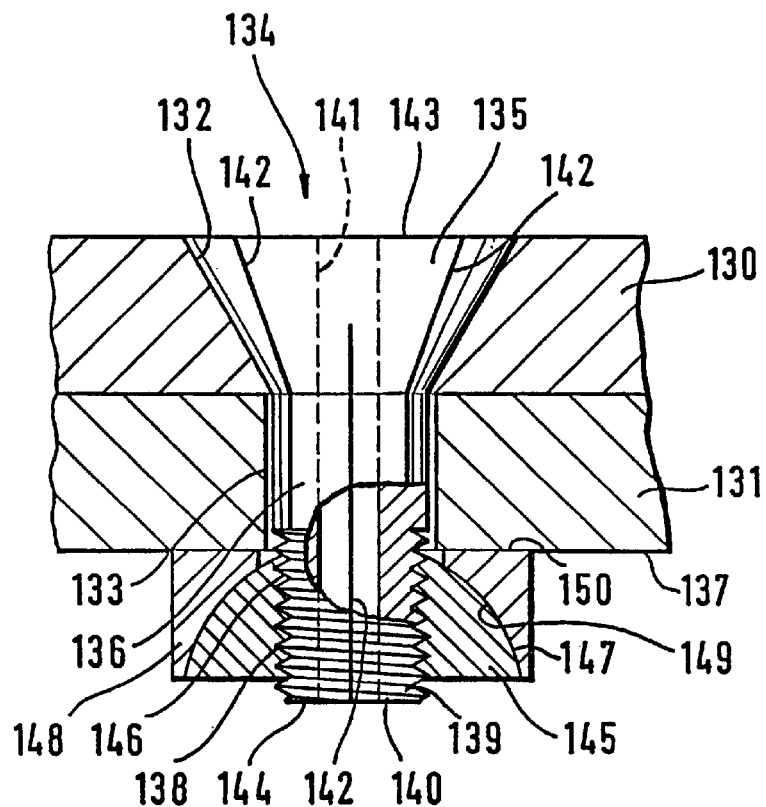
FIG. 11 shows a partial sectional representation of a sixth embodiment of the device according to the invention.

A further alternative embodiment of the device according to the invention is shown in FIG. 11. In this case through bores 132 and 133 respectively through which a connection element 134 passes are machined into a first joined part 130 and a second joined part 131. Whereas the through bore 132 of the first joined part 130 tapers conically in the direction of the second joined part 131, the through bore 133 of the second joined part 131 is of cylindrical construction. The connection element 134 comprises a connection head 135 constructed in the form of a tapered frustum which rests in surface contact on the wall of the through bore 132 of the first joined part 130 as well as an adjoining cylindrical connection shank 136 which projects out of a lower face 137 of the second joined part 131 facing away from the first joined part 130. In its region projecting out of the lower face 137 there is disposed on the outer surface of the connection shank 136 an enlarged portion 138 which surrounds the connection shank spirally and includes a first undercut 139 facing the first joined part 130 and a second undercut 140 facing away from the first joined part 130.

Corresponding to the enlarged portion 138 the first and second undercuts 139 and 140 respectively also surround the connection shank 136 spirally. Thus the connection shank 136 is constructed with a type of external thread which is formed by the enlarged portion 138.

A spreading element (not shown in the drawing) can be introduced into a central bore 141 which passes through the connection element 134 in the longitudinal direction. The connection element 134 also has four longitudinal slots which are only shown schematically in the drawing and which cross over one another centrally transversely of the longitudinal direction of the connection element 134, two longitudinal slots opening into a head end surface 143 and two further longitudinal slots opening into a shank end surface 144.

The region of the connection shank 136 projecting from the lower face 134 is surrounded by a guard element 145 which encloses a through bore 146 in the edge of which a spiral recess is machined, the shape of which corresponds to the spiral enlarged portion 138 of the connection shank 136. In this way it is ensured that the enlarged portion 138 rests in surface contact on the wall of the bore 146. The guard element 145 has an outer surface which is constructed as a cut-out from a spherical surface and on which a sleeve 148 rests with an end surface 149 corresponding to the outer surface 147. An end surface 150 of the sleeve 148 lying opposite the end surface 149 comes to rest on the lower face 137 of the second joined part 131. Thus the sleeve 148 is clamped between the outer surface 147 of the guard element 145 and the end face 137 of the second joined part 131.

The connection element 134 can be introduced into the through bores 132 and 133 of the two joined parts 130 and 131 respectively and because of the spiral arrangement of the enlarged portion 138 it can be screwed into the through bore 146 of the guard ring 145. Then by the insertion of a spreading element (not shown in the drawing) into the central bore 146 of the connection element 134, the connection element is spread so far that the connection head 135 rests in surface contact on the wall of the through bore 132 of the first joined part 30 and simultaneously the spiral enlarged portion 138 of the connection shank 136 rests in surface contact on the through bore 146 of the guard element 145.

An elastic deformation of the connection element 134 is only necessary for the expansion, it does not have to be additionally compressed during insertion. Thus such an embodiment is particularly suitable for extremely brittle materials, since only-a very slight deformation is necessary.

Figure 12:
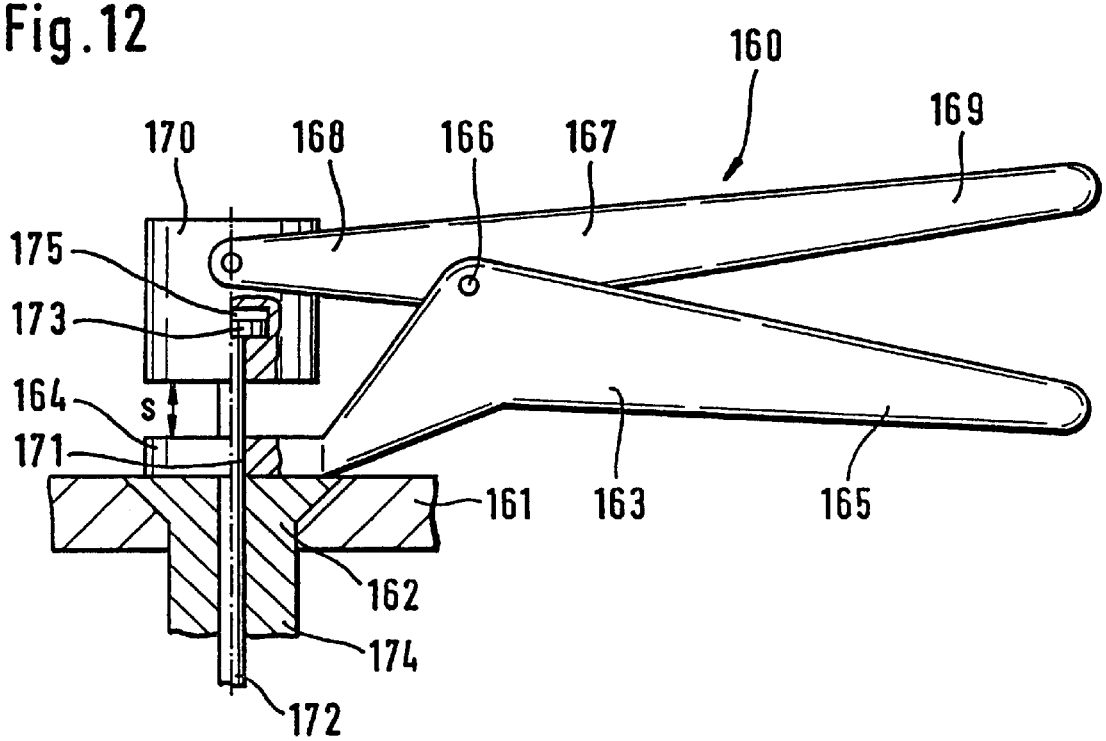
FIG. 12 shows a schematic representation of an assembly tool.

In FIG. 12 an assembly tool 160 is shown schematically which can be placed onto a connection head 162 of a connection element 174, which connection head is passed through an opening in a first joined part 161, in order to draw in a spreading element (not shown in the drawing) into a receiving portion (likewise not shown in the drawing) of the connection element 174. The assembly tool 160 is constructed like pincers and comprises a holding arm 163 with a bearing plate 164 for bearing on the connection head 162 and a handle 165 disposed at the opposite end as well as an actuating arm 167 mounted pivotably on the holding arm 163 by way of a hinge joint 166 disposed between the handle 165 and the bearing plate 164. The actuating arm 167 is constructed as a two-armed lever and is divided by the hinge joint 166 into a traction lever 168 facing the bearing plate 164 and a pressure lever 169 lying opposite the hinge joint 166. The traction lever 168 and the bearing plate 164 form the pincer mouth of the assembly tool 160 which opens when the pressure lever 169 is pivoted in the direction of the handle 165.

A measuring and holding part 170 which is merely shown schematically in the drawing is articulated on the traction lever 168, and a pull rod 172 which is connected to the spreading element and is passed through a through channel in the connection element 174 as well as through a through bore 171 in the bearing plate 164 can be anchored in this measuring and holding part. For this purpose a T-shaped end region 173 of the pull rod 172 which projects out of the bearing plate 164 in the direction of the measuring and holding part 170 can be introduced into a corresponding opening 174 in the measuring and holding part 170, so that the pull rod 172 is held in the measuring and holding part 170 so that it cannot be displaced in the longitudinal direction. If the pressure lever 169 is pivoted in the direction of the handle 165, then a tensile force is exerted thereby via the measuring and holding part 170 on the pull rod 172, so that the spreading element connected to the pull rod 172 can be drawn into the receiving portion of the connection element 174. In this case the assembly tool 160 is merely supported with the bearing plate 164 on the connection head 162, so that the first joined part 161 is not subjected to any load when the spreading element is being drawn in.

The measuring and holding part 170 serves not only to receive the pull rod 172 but also to determine the distance travelled by the pull rod 172 when the spreading element is drawn in and thus to determine the position of the spreading element in the connection element 174 as well as the tensile force exerted on the pull rod 172. For this purpose the distance denoted by s in the drawing from the measuring and holding part 170 to the bearing plate 164 is determined. The different spacing between the measuring and holding part 170 and the bearing plate 164 before and after the pivoting of the pressure lever 169 in the direction of the handle 165 corresponds to the distance travelled by the pull rod when the spreading element is pulled in. Furthermore, with the aid of a dynamometer the force with which the pull rod 172 is pulled upwards is measured. As a result the position of the spreading element inside the connection element can be determined, and a controlled force can be exerted on the spreading element.

The present disclosure relates to the subject matter disclosed in PCT Application No. PCT/EP96/04280 of Sep. 30, 1996, the entire specification of which is incorporated herein by reference.

What is claimed is:

1. A device for transmitting forces between two joined parts, comprising:
 (i) a connection element adapted to be introduced into two corresponding openings in the two joined parts, said connection element comprising:
   a connection head with a first undercut running obliquely with respect to the direction of transmission of force,
   a connection shank which starts from the connection head and has an enlarged portion having a second undercut facing the first undercut,
   a guard element which envelops the connection shank in the region of the enlarged portion and is adapted to rest in surface contact on the outer surface of the enlarged portion,
   a longitudinal slot which starts from a shank end surface of the connection element, runs in the direction of transmission of force and extends to the height of the enlarged portion, and (ii) a spreading element which spreads the connection shank in the region of the enlarged portion and is adapted to be introduced into a receiving portion of the connection element which starts from an end surface of the connection element, runs in the direction of transmission of force and extends to the height of the longitudinal slot, wherein:

the connection shank is constructed in such a way that, before the introduction of the spreading element into the receiving portion of the connection element, the connection shank is adapted to be applied with the second undercut in surface contact on a second contact surface that is operatively connected to the second joined part.

2. A device as claimed in claim 1, wherein the connection element is of rotationally symmetrical construction.

3. A device as claimed in claim 1, wherein the connection shank is of cylindrical construction.

4. A device as claimed in claim 1, wherein the enlarged portion is constructed as a tapered frustum and forms a cone.

5. A device as claimed in claim 4, wherein the enlarged portion has a cone angle of approximately 2° to approximately 8°.

6. A device as claimed in claim 4, wherein the enlarged portion has a cone angle of approximately 3° to approximately 5°.

7. A device as claimed in claim 1, wherein:

the device includes a filling compound which is adapted to be deformably introduced into the longitudinal slot of the connection element, and hardened in the longitudinal slot.

8. A device as claimed in claim 1, wherein a sleeve is used as the guard element.

9. A device as claimed in claim 1, wherein the guard element includes a conically widening through bore, the cone angle of the through bore corresponding to the cone angle of the enlarged portion.

10. A device as claimed in claim 1, wherein the guard element is connectable to the second joined part.

11. A device as claimed in claim 1, wherein the receiving portion is of rotationally symmetrical construction.

12. A device as claimed in claim 1, wherein the spreading element is of cylindrical construction.

13. A device as claimed in claim 1, wherein the spreading element is constructed as a tapered frustum which forms a spreading cone.

14. A device as claimed in claim 1, wherein the spreading element has a corrugation on its outer surface.

15. A device as claimed in claim 1, wherein a toothing is disposed on the outer surface of the spreading element.

16. A device as claimed in claim 1, wherein a toothing is disposed on the wall of the receiving portion.

17. A device as claimed in claim 1, further comprising:

a filling compound which is adapted to be deformably introduced into the receiving portion in the region between the inserted spreading element and the end surface of the connection element and hardened in the receiving portion.

18. A device as claimed in claim 1, wherein at least one of the connection element and the spreading element is made from a ceramic material.

19. A device as claimed in claim 1, wherein the guard element is made from a ceramic material.

20. A device as claimed in claim 1, wherein at least one of the connection element and the spreading element is made from a fibrous ceramic material.

21. A device as claimed in one claim 1, wherein the guard element is made from a fibrous ceramic material.

22. A device as claimed in claim 1, wherein the guard element is made from at least one of a heat-insulating and an electrically insulating material.

23. A device for transmitting forces between first and second joined parts, comprising:

a connection element having a connection head and a connection shank, the connection element being divided in a longitudinal direction into two or more separate segments by means of a longitudinal slot running in the direction of transmission of force and extending through the connection element, and a spreading element which spreads the segments and which can be introduced into a receiving portion of the connection element that starts from an end surface of the connection element running in the direction of transmission of force, wherein:

a first undercut is disposed on said connection head and extends obliquely with respect to the direction of transmission of force for application to a first contact surface which is operatively connected to the first joined part, said connection shank starts from the connection head with an enlarged portion which has a second undercut facing the first undercut for introduction into an opening in the second joined part, such that during said introduction the connection shank is compressed in the region of the enlarged portion, a guard element which envelops the connection shank in the region of the enlarged portion and is adapted to rest in surface contact on the outer surface of the enlarged portion, and the connection shank is adapted to be introduced into the opening in the second joined part in such a way that, before the introduction of the spreading element into the receiving portion of the connection element, the connection shank spreads again and rests with the second undercut in surface contact on a second contact surface which is operatively connected to the second joined part.

24. A device for transmitting forces between two joined parts, comprising:

(i) a connection element adapted to be introduced into two corresponding openings in the two joined parts, said connection element comprising:

a connection head with a first undercut running obliquely with respect to the direction of transmission of force;

a connection shank which starts from the connection head and has an enlarged portion having a second undercut facing the first undercut;

a longitudinal slot which starts from a shank end surface of the connection element, runs in the direction of transmission of force and extends to the height of the enlarged portion; and (ii) a spreading element which spreads the connection shank in the region of the enlarged portion and is adapted to be introduced into a receiving portion of the connection element which starts from an end surface of the connection element, runs in the direction of transmission of force and extends to the height of the longitudinal slot, wherein:

the connection shank is constructed in such a way that, before the introduction of the spreading element into the receiving portion of the connection element, the connection shank is adapted to be applied with the second undercut in surface contact on a second contact surface that is operatively connected to the second joined part, wherein the device includes a filling compound which is adapted to be deformably introduced into the longitudinal slot of the connection element, and hardened in the longitudinal slot.

25. A method for transmitting forces between two joined parts, comprising the steps of:
(i) introducing a connection element into two corresponding openings in the two joined parts, wherein:
a first undercut which is disposed on a connection head of the connection element and extends obliquely with respect to the direction of transmission of force is applied to a first contact surface which is operatively connected to the first joined part,
a connection shank starting from the connection with an enlarged portion which has a second undercut facing the first undercut is introduced into the opening in the second joined part,
during the introduction, the connection shank, which has a longitudinal slot starting from the end surface at a shank end of the connection element, running in the direction of transmission of force and extending to the height of the enlarged portion, is compressed in the region of the enlarged portion, and
(ii) after the introduction of the connection shank, wherein a guard element which envelops the connection shank in the region of the enlarged portion rests in surface contact on the outer surface of the enlarged portion, introducing a spreading element which spreads the connection shank in the region of the enlarged portion into a receiving portion of the connection element which starts from an end surface of the connection element, runs in the direction of transmission of force and extends to the height of the longitudinal slot,
wherein the connection shank is introduced into the opening in the second joined part in such a way that, before the introduction of the spreading element into the receiving portion of the connection element, the connection shank spreads again and rests with the second undercut in surface contact on a second contact surface which is operatively connected to the second joined part.

26. A method as claimed in claim 25, wherein the connection element is of rotationally symmetrical construction.

27. A method as claimed in claim 25, wherein the connection shank is of cylindrical construction.

28. A method as claimed in claim 25, wherein the connection shank has an enlarged portion constructed as a tapered frustum which forms a cone.

29. A method as claimed in claim 28, wherein the connection shank has an enlarged portion having a cone angle of approximately 2° to approximately 8°.

30. A method as claimed in claim 28, wherein the connection shank has an enlarged portion having a cone angle of approximately 3° to approximately 5°.

31. A method as claimed in claim 25, wherein after the introduction of the connection element into the openings of the two joined parts a deformable filling compound is introduced into the longitudinal slot of the connection element and is then hardened.

32. A method as claimed in claim 25, wherein a sleeve is used as the guard element.

33. A method as claimed in claim 25, wherein the guard element has a conically widening through bore, the cone angle of the through bore corresponding to the cone angle of the enlarged portion.

34. A method as claimed in claim 25, wherein the guard element is adapted to be connected to the second joined part.

35. A method as claimed in claim 25, wherein said receiving portion is of rotationally symmetrical construction.

36. A method as claimed in claim 25, wherein said spreading element is of cylindrical construction.

37. A method as claimed in claim 25, wherein the spreading element is constructed as a tapered frustum which forms a spreading cone.

38. A method as claimed in claim 25, wherein the spreading element has a corrugation on its outer surface.

39. A method as claimed in claim 25, wherein the spreading element has a toothing on the outer surface.

40. A method as claimed in claim 25, wherein the receiving portion has a toothing on its wall.

41. A method as claimed in claim 25, wherein a deformable filling compound is introduced into the receiving portion in the region between the inserted spreading element and the end surface of the connection element and the compound is subsequently hardened in the receiving portion.

42. A method as claimed in claim 25, wherein at least one of the connection element, guard element and spreading element is made from a ceramic material.

43. A method as claimed in claim 25, wherein the guard element made from a ceramic material.

44. A method as claimed in claim 25, wherein at least one of the connection element and spreading element is made from a fibrous ceramic material.

45. A method as claimed in claim 25, wherein the guard element made from a fibrous ceramic material.

46. A method as claimed in claim 25, wherein said guard element is at least one of heat-insulating and electrically insulating.

47. A method for transmitting forces between two joined parts, comprising the steps of:
(i) introducing a connection element into two corresponding openings in the two joined parts, wherein:
a connection head of the connection element is applied to a first contact surface which is operatively connected to the first joined part,
a connection shank starting from the connection head is introduced into the opening in the second joined part, wherein a guard element which envelops the connection shank in the region of the enlarged portion rests in surface contact on the outer surface of the enlarged portion,
the connection element used is one that is divided in the longitudinal direction into two or more separate segments by means of a longitudinal slot running in the direction of transmission of force and extending through the connection element,
the connection element is applied to a second contact surface which is operatively connected to the second joined part, and
(ii) introducing a spreading element which spreads the segments into a receiving portion of the connection element that starts from an end surface of the connection element running in the direction of transmission of force.

48. A method for transmitting forces between two joined parts, comprising the steps of:
(i) introducing a connection element into two corresponding openings in the two joined parts, wherein:

a first undercut which is disposed on a connection head of the connection element and extends obliquely with respect to the direction of transmission of force is applied to a first contact surface which is operatively connected to the first joined part;

a connection shank starting from the connection with an enlarged portion which has a second undercut facing the first undercut is introduced into the opening in the second joined part;

during the introduction, the connection shank, which has a longitudinal slot starting from the end surface at a shank end of the connection element, running in the direction of transmission of force and extending to the height of the enlarged portion, is compressed in the region of the enlarged portion; and (ii) after the introduction of the connection shank, introducing a spreading element which spreads the connection shank in the region of the enlarged portion into a receiving portion of the connection element which starts from an end surface of the connection element, runs in the direction of transmission of force and extends to the height of the longitudinal slot, wherein:

the connection shank is introduced into the opening in the second joined part in such a way that, before the introduction of the spreading element into the receiving portion of the connection element, the connection shank spreads again and rests with the second undercut in surface contact on a second contact surface which is operatively connected to the second joined part; and after the introduction of the connection element into the openings of the two joined parts, a deformable filling compound is introduced into the longitudinal slot of the connection element and is then hardened.

* * * * *